US006526952B1

(12) United States Patent
Price

(10) Patent No.: US 6,526,952 B1
(45) Date of Patent: Mar. 4, 2003

(54) PRE-COMBUSTION CHAMBER FUEL VAPORIZATION AND AERATION SYSTEM FOR INTERNAL COMBUSTION ENGINES

(76) Inventor: Ron Price, 150 Campbell Ave., Pasadena, TX (US) 77502

( * ) Notice: Subject to any disclaimer, the term of this patent is extended or adjusted under 35 U.S.C. 154(b) by 0 days.

(21) Appl. No.: 09/851,439
(22) Filed: May 7, 2001
(51) Int. Cl.[7] ............................................... F02M 17/28
(52) U.S. Cl. ..................................... 123/522; 123/543
(58) Field of Search ............................... 123/543–549, 123/590–593, 522

(56) References Cited

U.S. PATENT DOCUMENTS

| | | | | |
|---|---|---|---|---|
| 3,713,429 A | * | 1/1973 | Dwyre ........................ | 123/522 |
| 3,792,688 A | * | 2/1974 | Grainger ..................... | 122/248 |
| 4,106,457 A | * | 8/1978 | Totten et al. ................ | 123/522 |
| 4,270,505 A | * | 6/1981 | Johnson ...................... | 123/522 |
| 4,312,317 A | * | 1/1982 | Jewett et al. ................ | 123/522 |
| 4,372,275 A | * | 2/1983 | Schmidt ...................... | 123/522 |
| 4,412,521 A | * | 11/1983 | Silva, Jr. .................... | 123/522 |
| 4,476,841 A | * | 10/1984 | Duckworth .................. | 123/522 |
| 4,681,081 A | * | 7/1987 | Lapan .......................... | 123/522 |

* cited by examiner

Primary Examiner—Marguerite McMahon
(74) Attorney, Agent, or Firm—Joseph N. Breaux

(57) ABSTRACT

A pre-combustion chamber fuel vaporization and aeration system for an internal combustion engine that includes a fuel vaporization and air mixing chamber housing having an aerated fuel vapor outlet opening, a fuel inlet system, and an air inlet system. A fuel supply method for supplying fuel and air to an intake manifold of an internal combustion engine having a fuel tank is also provided that includes the steps of a) providing a pre-combustion chamber fuel vaporization and aeration system for internal combustion engines; b) installing the fuel inlet system in connection with the gas tank; and c) installing the aerated fuel vapor outlet opening in connection with the intake manifold of the internal combustion engine.

3 Claims, 2 Drawing Sheets

PRE-COMBUSTION CHAMBER FUEL VAPORIZATION AND AERATION SYSTEM FOR INTERNAL COMBUSTION ENGINES

TECHNICAL FIELD

The present invention relates to methods of supplying fuel to an internal combustion engine and more particularly to a method of supplying fuel to a combustion chamber of an internal combustion engine that has been pre-aerated using a pre-combustion chamber fuel vaporization and aeration system for internal combustion engines of the present invention.

BACKGROUND ART

Internal combustion engines typically have injectors that inject ambient temperature fuel into the combustion chamber of the internal combustion chamber of the engine where it is mixed with sufficient air to explode when ignited by a spark from a spark plug. Although this method of supply fuel to the combustion chamber of an engine is effective, it has been found by the inventor hereof that the aforementioned fuel supply method is inefficient in that he has discovered larger amounts of fuel must be used during each combustion cycle than with the method taught and claimed herein of supplying fuel that has been vaporized and pre-aerated to the combustion chamber using one of the many types of pre-combustion chamber fuel vaporization and aeration systems for internal combustion engines taught herein.

GENERAL SUMMARY DISCUSSION OF INVENTION

It is thus an object of the invention to provide a fuel supply method for supplying fuel and air to an intake manifold of an internal combustion engine that includes using a pre-combustion chamber fuel vaporization and aeration system for internal combustion engines of the type taught herein.

Accordingly, a pre-combustion chamber fuel vaporization and aeration system for internal combustion engines is provided. The pre-combustion chamber fuel vaporization and aeration system for internal combustion engines includes a fuel vaporization and air mixing chamber that has been installed between the fuel tank and the intake manifold of an internal combustion engine. It has been found by the inventor hereof that numerous and various mechanism may be used for vaporizing and aerating the vaporized fuel to create a highly efficient fuel source for exploding within the combustion chamber of an internal combustion engine. It has also been found by the inventor hereof that it is beneficial to provide one or more spring loaded safety gates or valves in the conduit or piping provided between the outlet of the fuel vaporization and air mixing chamber and the intake manifold of the internal combustion engine to prevent the possibility of an explosion within the fuel vaporization and air mixing chamber should a backfire occur within the internal combustion engine.

In an exemplary embodiment of the pre-combustion chamber fuel vaporization and aeration system for internal combustion engines taught herein the pre-combustion chamber fuel vaporization and aeration system for internal combustion engines includes a fuel vaporization and air mixing chamber housing, a fuel inlet system, and an air inlet system; the fuel vaporization and air mixing chamber housing having an interior compartment provided therein that is divided by several horizontally oriented steel plates each provided with a number of small holes therethrough to create a bottom liquid fuel and air receiving chamber and a top aerated fuel vapor chamber; the fuel inlet system including a float valve having a valve inlet in connection with a pressurized fuel line, a valve controlling float and a fuel outlet opening, the valve controlling float and the fuel outlet opening being installed within a perforated float enclosure provided as part of the fuel inlet system and positioned within the bottom liquid fuel and air receiving chamber, the valve controlling float being adjusted to maintain a desired fluid fuel level within the bottom liquid fuel and air receiving chamber, the perforated float enclosure having sufficient perforations to allow fuel to flow freely from the perforated float enclosure to the bottom liquid fuel and air receiving chamber; the air inlet system including a one-way air flow piping structure having an inlet opening positioned outside the fuel vaporization and air mixing chamber housing and an air outlet positioned along the bottom of the bottom liquid fuel and air receiving chamber such that air must bubble up through the liquid fuel in the bottom liquid fuel and air receiving chamber; the movement of the vehicle and the bubbling of the air emitted from the air outlet of the one-way air flow piping structure through the liquid fuel along with the requirement that the fuel and air travel out of the bottom liquid fuel and air receiving chamber through the number of small holes formed through the horizontally oriented steel plates to reach the top aerated fuel vapor chamber causes the liquid fuel to become vaporized and aerated prior to entering top aerated fuel vapor chamber where the vacuum generated by the internal combustion engine within the intake manifold causes the fuel vapor air mixture to be sucked out of the top aerated fuel vapor chamber past the safety valves and into the intake manifold of the internal combustion engine.

In this embodiment, an optional fuel warmer unit is provided and positioned at the bottom of the bottom liquid fuel and air receiving chamber to warm the liquid fuel to increase the vaporization rate of the liquid fuel. The fuel warmer unit warms the liquid fuel but only to a temperature well below the flash point of the fuel. Although a fuel warmer is placed in connection with the liquid fuel in this exemplary embodiment, it should be clearly understood that the liquid fuel could be warmed using various other modalities including warming the air prior to allowing the air to mix with the liquid fuel.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
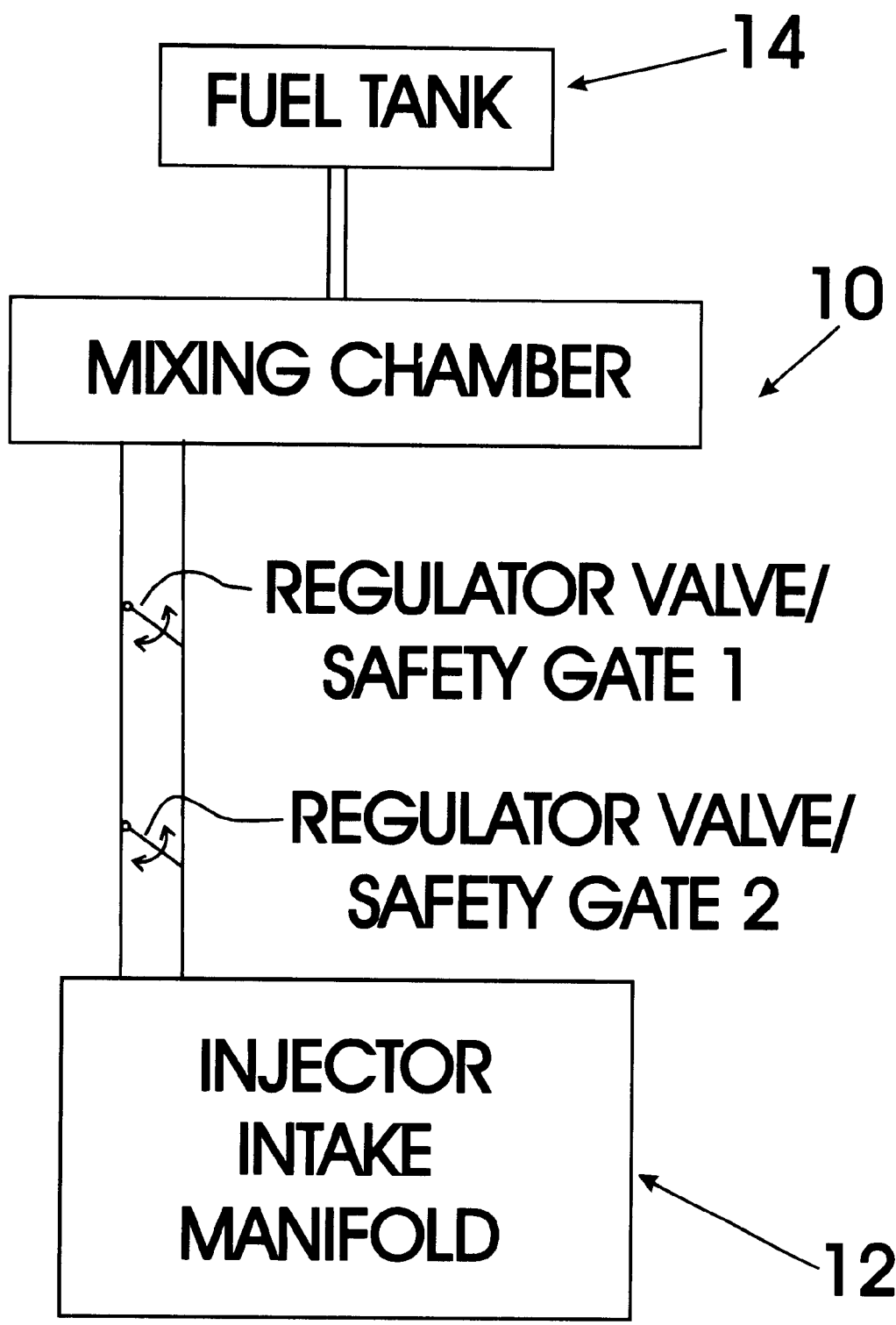
FIG. 1 is a schematic diagram of the pre-combustion chamber fuel vaporization and aeration system installed between the fuel tank and the fuel injector intake manifold.
Figure 2:
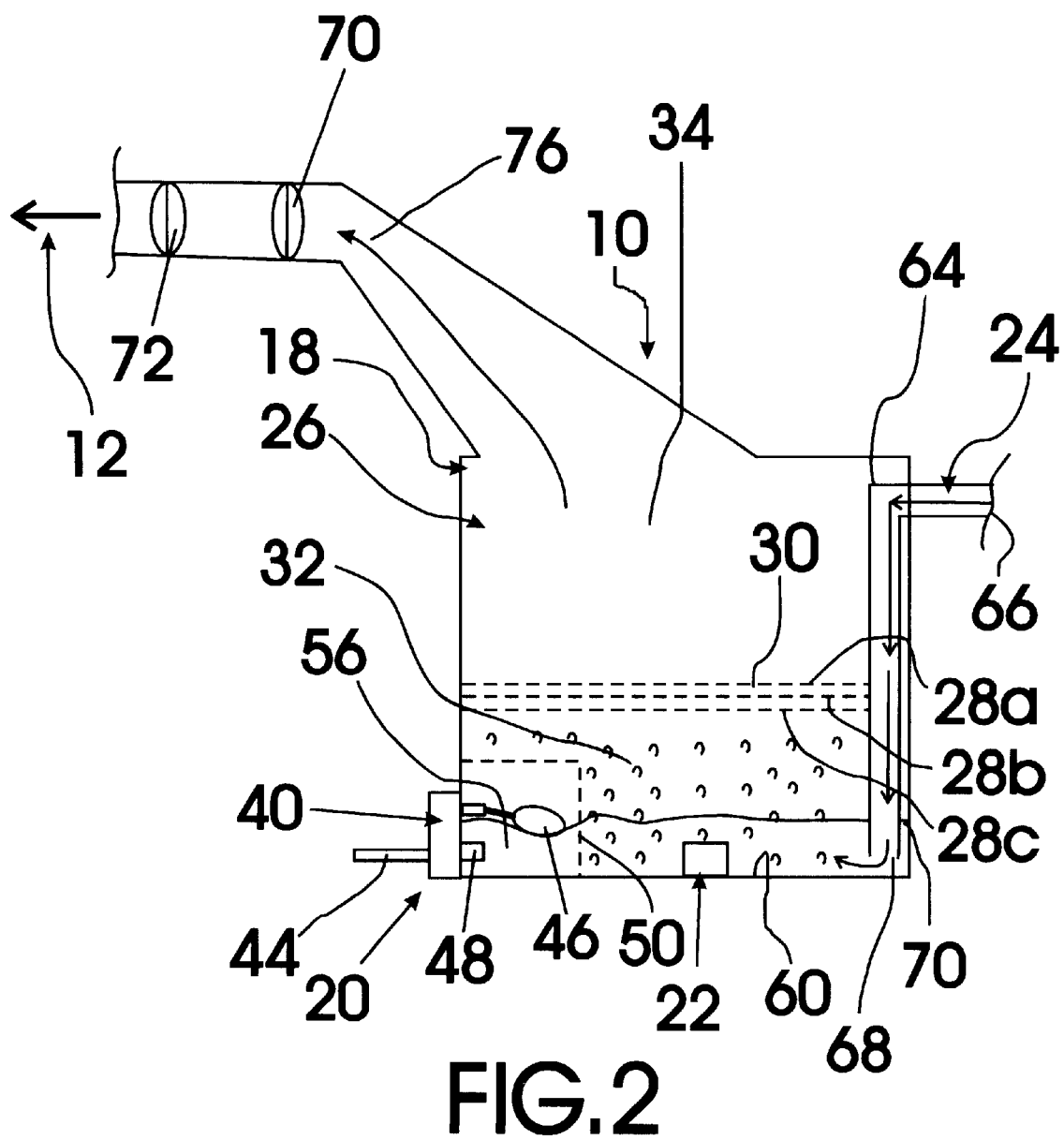
FIG. 2 is a schematic diagrammatic drawing of an exemplary embodiment of the pre-combustion chamber fuel vaporization and aeration system of the present invention.

FIGS. 1 and 2 show various aspects of an exemplary embodiment of the pre-combustion chamber fuel vaporization and aeration system for internal combustion engines of the present invention generally designated 10. In the method taught herein, a pre-combustion chamber fuel vaporization and aeration system for internal combustion engines 10 is provided and installed between a fuel tank 14 and an intake manifold 12 of an internal combustion engine.

Pre-combustion chamber fuel vaporization and aeration system for internal combustion engines 10 includes a fuel vaporization and air mixing chamber housing, generally designated 18; a fuel inlet system, generally designated 20; a fuel warmer unit, generally designated 22; and an air inlet system, generally designated 24.

Fuel vaporization and air mixing chamber housing 18 has an interior compartment 26 provided therein that is divided by several horizontally oriented steel plates 28a,28b,28c each provided with a number of small holes 30 therethrough to create a bottom liquid fuel and air receiving chamber 32 and a top aerated fuel vapor chamber 34.

Fuel inlet system 20 including a float valve, generally designated 40, having a valve inlet 42 in connection with a pressurized fuel line 44, a valve controlling float 46 and a fuel outlet opening 48. Valve controlling float 46 and fuel outlet opening 48 are installed within a perforated float enclosure 50 provided as part of the fuel inlet system 20 and positioned within the bottom liquid fuel and air receiving chamber 32. Valve controlling float 46 is adjusted to maintain a desired fluid fuel level 52 within bottom liquid fuel and air receiving chamber 32. Perforated float enclosure 50 has sufficient perforations to allow liquid fuel 56 to flow freely from perforated float enclosure 50 to bottom liquid fuel and air receiving chamber 32.

Fuel warmer unit 22 is electrically powered and is provided and positioned on the bottom surface 60 of bottom liquid fuel and air receiving chamber 32 to warm the liquid fuel 56 to increase its vaporization rate.

Air inlet system 24 includes a one-way air flow piping structure 64 having an inlet opening 66 positioned outside fuel vaporization and air mixing chamber housing 18 and an air outlet 68 positioned just above the bottom surface 60 of bottom liquid fuel and air receiving chamber 32 such that air 70 must bubble up through liquid fuel 56 in bottom liquid fuel and air receiving chamber 32.

In use, the combination of warming the liquid fuel 56 with warming unit 22, bubbling air 70 through the liquid fuel 56 to agitate the liquid fuel 56 and expose the surface area of the liquid fuel to the air, and the further contact between the air 70 and the liquid fuel 56 by requiring the air 70 and liquid and vaporized fuel 56 to pass simultaneously from bottom liquid fuel and air receiving chamber 32 through the number of small holes 30 formed through the three horizontally oriented steel plates 28a–c to reach top aerated fuel vapor chamber 34 causes the liquid fuel 56 to become vaporized and aerated prior to entering top aerated fuel vapor chamber 34 where a vacuum generated by the internal combustion engine within the intake manifold causes the fuel vapor air mixture within the top aerated fuel vapor chamber 34 to be sucked out of an aerated fuel vapor outlet opening 76 of top aerated fuel vapor chamber 34 past safety valves 70,72 and into intake manifold 12 of the internal combustion engine.

It can be seen from the preceding description that a pre-combustion chamber fuel vaporization and aeration system for internal combustion engines has been provided.

It is noted that the embodiment of the pre-combustion chamber fuel vaporization and aeration system for internal combustion engines described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A pre-combustion chamber fuel vaporization and aeration system for internal combustion engines comprising:

a fuel vaporization and air mixing chamber housing;

a fuel inlet system; and an air inlet system;

the fuel vaporization and air mixing chamber housing having an interior compartment provided therein that is divided by a number of horizontally oriented plates each provided with a number of holes therethrough to create a bottom liquid fuel and air receiving chamber and a top aerated fuel vapor chamber;

the fuel inlet system including a float valve having a valve inlet in connection with a pressurized fuel line, a valve controlling float and a fuel outlet opening; said valve controlling float and fuel outlet opening being installed within a perforated float enclosure provided as part of the fuel inlet system and positioned within the bottom liquid fuel and air receiving chamber; the valve controlling float being adjusted to maintain a desired fluid fuel level within the bottom liquid fuel and air receiving chamber; the perforated float enclosure having sufficient perforations to allow liquid fuel to flow freely from the perforated float enclosure to the bottom liquid fuel and air receiving chamber;

the air inlet system includes a one-way air flow piping structure having an inlet opening positioned outside fuel vaporization and air mixing chamber housing and an air outlet positioned just above a bottom surface of the bottom liquid fuel and air receiving chamber such that air emitted from the air outlet must bubble up through liquid fuel in the bottom liquid fuel and air receiving chamber.

2. The pre-combustion chamber fuel vaporization and aeration system for internal combustion engines of claim 1 further comprising:

a fuel warmer unit positioned on the bottom surface of the bottom liquid fuel and air receiving chamber.

3. A fuel supply method for supplying fuel to an intake manifold of an internal combustion engine from a gas tank; the fuel supply method include the steps of:

a) providing a pre-combustion chamber fuel vaporization and aeration system for an internal combustion engine that includes a fuel inlet system and an aerated fuel vapor outlet opening;

b) installing the fuel inlet in connection with the gas tank; and c) installing the aerated fuel vapor outlet opening in connection with the intake manifold of the internal combustion engine.

* * * * *